US011271949B1

(12) United States Patent
Kruse et al.

(10) Patent No.: US 11,271,949 B1
(45) Date of Patent: Mar. 8, 2022

(54) APPLICATION-BASED SCANNING

(71) Applicant: Amazon Technologies, Inc., Seattle, WA (US)

(72) Inventors: William Frederick Kruse, Seattle, WA (US); Ryan Pickren, Seattle, WA (US); Guifre Ruiz Utges, Terrassa (ES); Zak Aaron Edwards, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 16/451,926

(22) Filed: Jun. 25, 2019

(51) Int. Cl.
 *H04L 29/06* (2006.01)
 *H04L 67/02* (2022.01)
 *H04L 51/00* (2022.01)

(52) U.S. Cl.
 CPC ......... *H04L 63/1408* (2013.01); *H04L 51/12* (2013.01); *H04L 63/1433* (2013.01); *H04L 63/20* (2013.01); *H04L 67/02* (2013.01)

(58) Field of Classification Search
 None
 See application file for complete search history.

(56) References Cited

U.S. PATENT DOCUMENTS

| 6,249,844 | B1 * | 6/2001 | Schloss | G06F 16/9574 711/122 |
|---|---|---|---|---|
| 6,286,006 | B1 * | 9/2001 | Bharat | G06F 16/9574 |
| 9,304,830 | B1 * | 4/2016 | Karppanen | G06F 9/52 |
| 9,614,900 | B1 * | 4/2017 | Jain | G06F 9/54 |
| 9,635,041 | B1 * | 4/2017 | Warman | H04L 63/1416 |
| 9,690,799 | B2 * | 6/2017 | Schreter | G06F 16/221 |
| 9,922,007 | B1 * | 3/2018 | Jain | G06F 16/9577 |
| 10,574,771 | B2 * | 2/2020 | Schejter | G06F 16/9566 |
| 10,798,127 | B2 * | 10/2020 | Sheretov | G06F 16/986 |
| 2010/0088761 | A1 * | 4/2010 | Podjarny | H04L 63/105 726/22 |
| 2012/0151308 | A1 * | 6/2012 | Falkenberg | G06F 16/9577 715/201 |
| 2013/0073536 | A1 * | 3/2013 | Fedorynski | G06F 16/951 707/709 |
| 2014/0059420 | A1 * | 2/2014 | Cole | G06F 16/9558 715/234 |
| 2014/0129920 | A1 * | 5/2014 | Sheretov | H04L 63/0281 715/234 |
| 2014/0164352 | A1 * | 6/2014 | Denninghoff | H03H 9/25 707/711 |
| 2015/0128280 | A1 * | 5/2015 | Messer | G06F 21/128 726/25 |
| 2016/0078144 | A1 * | 3/2016 | Claycomb | G06F 16/9566 715/234 |
| 2017/0032494 | A1 * | 2/2017 | Yuan | H04L 67/2828 |

\* cited by examiner

*Primary Examiner* — Lashonda T Jacobs

(74) *Attorney, Agent, or Firm* — Knobbe, Martens, Olson & Bear, LLP (57) ABSTRACT

The disclosure herein pertains to a security vulnerability scanner. The security vulnerability scanner parses a URL into a network portion and a fragment portion. The security vulnerability scanner then runs the URL on a network-side browser to generate processed results. Advantageously, the security vulnerability scanner is able to mimic a client side browser by running various fragment portions in order to analyze security risks.

31 Claims, 6 Drawing Sheets

APPLICATION-BASED SCANNING

BACKGROUND

Generally described, computing devices and communication networks can be utilized to exchange data and/or information. In a common application, a computing device can request content from another computing device via the communication network. For example, a user at a personal computing device can utilize a network-enabled application, such as a browser application, to request a content page (e.g., a network page, a Web page, etc.) from a server computing device via the network (e.g., the Internet). In such embodiments, the user computing device can be referred to as a client computing device and the server computing device can be referred to as a content provider.

Individual client computing devices may access content from a number of content providers. In some instances, undesired or malicious executable code can be included in the content provided by a content provider. If executed by the receiving client device, such as via a browser application, the undesired or malicious code can cause modification of an undesired client device, collect and transmit personal information, modify characteristics of a communication network, attempt to propagate to other computing devices, and the like. Accordingly, individual users or system administrators can implement some form of scanning or detection components that attempt to identify and block malicious or undesired code.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure corresponds to a system and method for scanning for vulnerabilities associated with content transmitted to a browser application. More specifically, one or more aspects of the present application correspond to a scanning system and method for monitoring the execution result on a browser application based on rendering instructions or commands with a portion of a uniform resource identifier ("URI"), the most common of which is a uniform resource locator ("URL"). Illustratively, a URL may be considered in terms of two primary portions. A first portion of the URL may generally be referred to as the network portion, which typically includes information transmitted by a content provider and browser application. A second the portion of the URL may be generally referred to as a fragment portion and is typically denoted by an identifier within the URL, such as the "#" symbol. Fragment portions of a URL are modifiable and are typically modified by execution of scripts or other executable code that can be requested by the client device during the rendering process. However, the fragment portions of URLs are not transmitted in such requests by the browser application during execution and rendering of the URL. Accordingly, the scanning system and method implements various scanning techniques in a browser application to identify potential vulnerabilities associated with the rendering of URLs, especially with regard to the fragment portion of the URL.

As described above, the network portion of URLs often includes a grouping of sections, sub-portions, or information that cumulative relate to information transmitted between a browser and network resources. The URL also can include a fragment portion that includes information or references to the network portion and which is typically denoted by information included after some form of symbol or identifier, which may be a hash sign (#). With reference to two illustrative examples, a first and second URL can be provided to a browser application, such as a content provider, will be described:

Example 1: https://www.example.com/fruits.html#apple;
Example 2: https://www.example.com/fruits.html#orange.

In both examples, the portion to the left of the hash sign is considered the network portion of the URL and can illustratively include information such as protocol identifiers, subdomain information, domain information, communication port identifiers, path information, query identifiers, parameters, and the like. For purposes of the illustration, the network portion of the two URLs is identical and may not change during the rendering of each respective URL. The portion to the right of the hash sign in each URL is considered the fragment portion, respectively "apple" and "orange". When a URL is processed at a browser application, the full webpage including various fragment portions is loaded onto the user's client browser along with the different views for the different fragments. In this example, the content associated with www.examples.com/fruits.html is requested twice. In both examples, the resource requests from the client device to the content provider, a hyptertext transfer protocol ("HTTP") request to the content provider for "fruits.html" is identical because the fragment portion of the URL is not passed in the request. As will be explained in detail below, the two requests are rendered by the requesting browser differently based on the apple fragment and orange fragment respectively. Thus, the resulting process result of the rendering for the two illustrative URLs may yield different results.

Security issues can be included in rendered URLs (e.g., pages) without being fully present upon loading merely the network portion. Issues embedded in different views are called cross-site scripting (XSS). Applying a scanning technique to the network portion of the URL does not test for XSS. In order to properly test for XSS, the security vulnerability scanner needs to be able to recreate the different processing result as based on different fragments. Examples 1 and 2 are examples of changes in the view fragment parameter that can change the code within the rendered result. Other examples of fragment parameters that can change the code within the webpage are color, location, state, search, tab, page, filter, tag, compliance, value, or text.

Furthermore, security issues can appear during runtime of a URL in a browser. Previously, a URL was static at runtime and would be run without change by the browser. However, current browser can modify the URL at runtime based on variables such as URI Fragments, the local storage of the client device, asynchronous javascript (AJAX) application programming interface (API) calls, and client device frameworks that render custom templates. Also, fragments can be used to hide security issues within a URL. Two examples are:

Example 3: https://example.com/foo?region=region1#/directory?name=<script src='https://bad.com/code.js'>;

Example 4: https://example.com/config/home?region=region1#/resource-listing?filter=% parameter1% parameter2% . . . parameterx In both of the examples, the information passed between the client device and content provider would be the network portion, which does not include the information indicative of malicious or undesired behavior or signs of the results of such malicious or undesired behavior.

Conventionally, security vulnerability scanners would run the URL by merely running what is seen by the network resources which is the network portion of the URL. The security vulnerability scanner would then inject various code into the loaded page in order to test for hidden vulnerabilities. However, by merely running the network portion, the URL would not be run with different fragment portions which could be used for XSS. This is not an adequate test of a URL for security issues. Security issues for the different views which are seen by entering different fragments remains hidden. Furthermore, the network resources lack client information that resides on the client computer. This client information changes how the URL interacts with the client-browser when loading. This can further obscure different views that could pose security risks.

Described herein is a URL scanner for applying scanning techniques related to rendering of URLs. In some embodiments, the client browser is an independent browser which independently requests content from a content provider, processes the received content (including requesting embedded resources or executing scripts), and renders the processed URL for display. One illustrative embodiment includes a client browser which includes software applications that captures and transmits captured URLs to a network-based security service. The network-based security service parses the URL to identify a network portion and a fragment portion. The network-based security service identifies one or more testing parameters based on the fragment portion. The security s network-based service selects a scanning technique based on the one or more testing parameters. The network-based security service that invokes one or more network-based browsers which render the network portion and various different fragment portions of the captured URLs. By using various different fragment portions, the security service can fully scan the URL for security issues which cannot be done by the conventional method of merely scanning the network portion of the URL.

In other embodiments, the client browser can be integrated in conjunction with a network-side browser. Illustratively, the network-side browser represents a mirror copy of at least a portion of the client browser and works in conjunction with the client browser application to request content from a content provider, process the received content (including requesting embedded resources or executing scripts), and render the processed content for display. The client browser and network-based browser can exchange configuration information that indicates how the processing will be divided or shared by the two browser. Such as configuration may be generally referred to as a split-browser configuration.

In a split-browser configuration, the network-side browser performs at least a portion of the actions/activities in lieu of the client-based browser. For example, in one embodiment, the network-based browser may perform the majority of the processing steps such that the network-based browser pre-renders the webpages for display in the client-side browser. The split-browser configuration includes the added advantage of the network-side browser including client information. The network-based mirrored browser is connected to the network-side browser and therefore will replicate the client information. This client information can include cookies and passwords that reside only on the client device. The client does not need to capture and transmit captured URL information because the network-based security service can utilize the network-based browser that already has the URL. The network-based security service then parses the URL to identify a network portion and a fragment portion. The network-based security service identifies one or more testing parameters based on the fragment portion. The security s network-based service selects a scanning technique based on the one or more testing parameters. The network-based security service that invokes one or more network-based browsers which render the network portion and various different fragment portions of the captured URLs. By using various different fragment portions, the security service can fully scan the URL for security issues which cannot be done by the conventional method of merely scanning the network portion the URL. Additionally, use of a security service integrated with a network-side browser can provide further views that could not be accessed by the security vulnerability scanner alone because these views may be specific to the client information.

Figure 1:
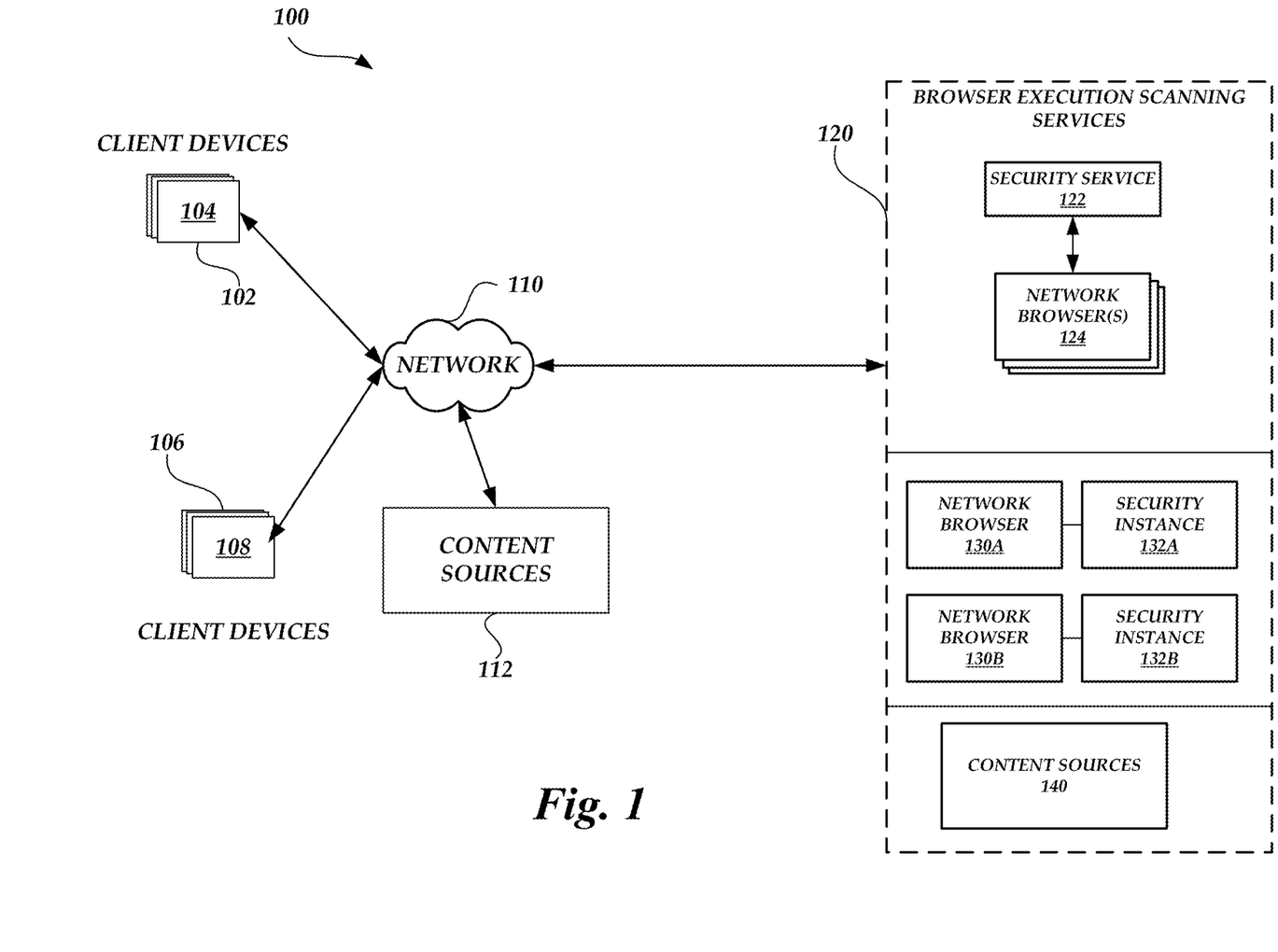
FIG. 1 is a block diagram of a web-browsing framework that includes one or more client devices, a content delivery service, and a browser execution scanning service according to one embodiment.

FIG. 1 illustrates a content delivery environment 100 with integrated security. For purposes of illustration, aspects of the present application will be described with regard to various interactions associated with a client browser application assessing content. Accordingly, the content delivery environment will be described with regard to a first set of client devices 102 that include a client-based browser 104 that is configured, at least in part, to capture and transmit URL information. The content delivery environment will be described with regard to a second set of client devices 106 that include a client based browser 108 that is configured, at least in part, to interact with a network-based browser application in accordance with a split-browser implementation. Illustratively, the client-based browser 104 may be configured to allow for a split-browser implementation. Similarly, the client-based browser 108 may be configured to capture and transmit URLs. Accordingly, the set of client devices 102 and 106 are described herein solely to illustrative different embodiments of the present application and not are not intended to limit the functionality of clients.

The first set of client device and second set of client devices may include any number of different computing devices capable of communicating with the network 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each of the first client device 102 and second client device 106 may optionally include one or more data stores (not shown in FIG. 1) including various applications or computer-executable instructions, such as web browsers, used to implement the embodiments disclosed herein. As previously indicated, although two different sets of client devices 102 and 106 are shown, one skilled in the relevant art will appreciate that there may not be differences in the operation of the client-based browsers 104 and 108 but are shown for illustrating multiple embodiments of the present application.

The content delivery environment 100 also includes a network execution scanning service 120 for processing URL information and implementing scanning services in accordance with multiple aspects of the present application. In one aspect, the network execution scanning service 120 includes a security service 122 is implemented to process and evaluate URL information provided by client browsers 104, generally referred to as captured URLs. The security service 122 utilized a set of network-based browsers 124 that facilitate accessing captured URL and allowing the executing of scanning techniques as will be described below. Illustrative components of the security service 122 will be described with regard to FIG. 2.

In accordance with other embodiments, the network execution scanning service 120 can also include a set of a first network security service 132A and second network security service 132B are implemented with the case where the client-based browsers 108 are client-side browsers which interface with network-side browsers 130A/130B. In each of these cases, the security service scans for XSS issues based upon at least one scanning technique which is used to test various fragment parameters.

The client-side browsers 104 are configured to interface with the content source 112 through the network 110 as independent browsers. The browser execution scanning service includes the security service 122 and one or more mirror browsers 124A/124B/124C. The security service is configured to execute one or more scanning algorithms on mirror browsers 124A/124B/124C. The security service 122 is configured to generated security results based execution of the URL with one or more scanning algorithms on the mirror browsers 124A/124B/124C.

The browser execution scanning service 120 includes one or more network browsers 130A/130B in a split-browser configuration. The client-side browsers 108 are client-side browsers which are configured to interact through the network 110 with the first network-side browser 130A and second network-side browser 130B. The browser execution scanning service 120 further includes the first network security service 132A and the second network security service 132B associated with the client browsers 108. The first network security service 132A and the second network security service 132B are each configured to run a first mirror browser 134A and a second mirror browser 134B, respectively. The first network-side browser 130A and second network-side browser 130B are each configured to pass a URL to the first network security service 132A and the second network security service 132B.

The first network-side browser 130A and second network-side browser 130B are also configured to connect to the first mirror browser 134A and second mirror browser 134B, respectively to mirror their respective content. Because the mirror browsers 134A/134B mirrors the content of the network-side browsers 130A/130B, the mirror browser can include at least a portion of the authentication, personalization or other client information used by the client browser 108 to access content. Access to such client information allows the mirror browser to perform a more robust test as opposed to the case of the independent browsers because some URLs interact with client information to present different content. Examples of client information would be cookies or saved passwords. Examples of cookies are session cookies, persistent cookies, secure cookies, HTTP-only cookies, same-site cookies, Third-party cookies, and supercookies. The first network security service 132A and second network security service 132B are configured to generate security results based on execution of the URL with one or more scanning algorithms on the first mirror browser 134A and second mirror browser 134B.

The testing strategy will be discussed more in the discussion of FIG. 6. The browser execution scanning service 120 is illustrated to include both the security system 122, content source virtual machines 140, mirror browsers 124A/124B/124C, network browsers 130A/130B, the network security systems 132A/132B, and mirror browsers 134A/134B. Alternatively, these systems can all be separately included in separate servers. These separate servers can each be connected to the client devices 102/106 through the network 110. The network browsers 130A/130B can be connected to the content source virtual machines 140 through the network 110. Alternatively, the network browsers 130A/130B can be connected to the content source virtual machines 140 through an alternative network. The alternative network may be a personal area network, local area network, wide area network, cable network, fiber network, satellite network, cellular telephone network, data network, or combination thereof. The WAN may be the internet.

It will be appreciated by those skilled in the art that the browser execution scanning service 120 may have fewer or greater components than are illustrated in FIG. 1. Thus, the depiction of the browser execution scanning service 120 in FIG. 1 should be taken as illustrative. For example, in some embodiments, components of the browser execution scanning service 120 may be executed by one more virtual machines implemented in a hosted computing environment. A hosted computing environment may include one or more rapidly provisioned and released computing resources, which computing resources may include computing, networking or storage devices. Additionally, while such components are illustrated as logically being logically grouped in FIG. 1, one skilled in the relevant art will appreciate that one or more aspects of the present application can include the browser execution scanning service 120 as being implemented in multiple geographic areas. Additionally, not all geographic areas hosting portions of the browser execution scanning service 120 will necessary have all the same components or combination of components.

Figure 2:
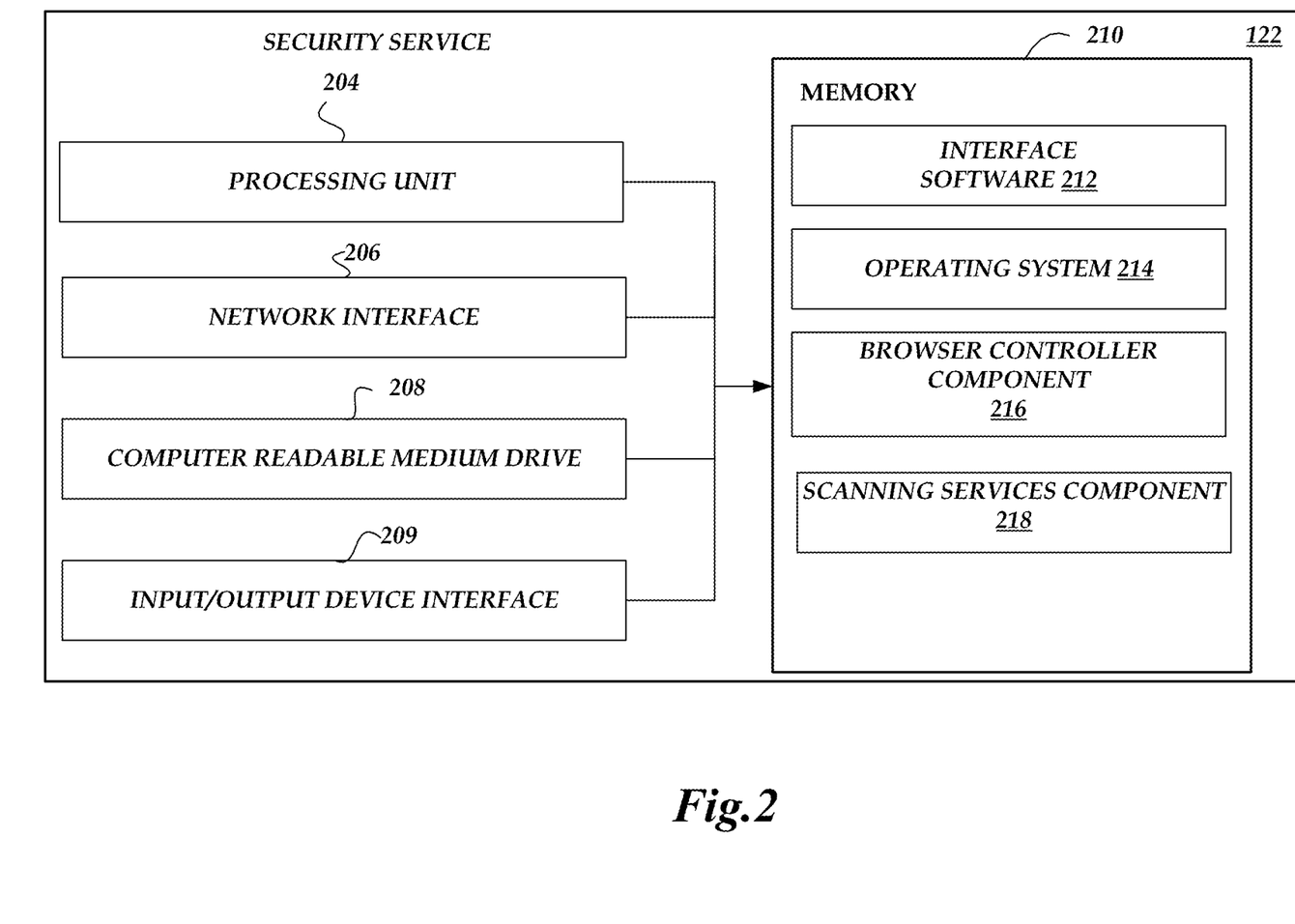
FIG. 2 is a block diagram of illustrative components of a security service configured to run a URL on one or more mirrored browsers in accordance with an illustrative embodiment.

FIG. 2 illustrates one embodiment of an architecture of an illustrative server for functioning as a security service 122 as described herein. As described above, the browser execution scanning service 120 includes a security service 122 that scans for security issues in a URL provided by client devices 102. The general architecture of the security service 122 depicted in FIG. 2 includes an arrangement of computer hardware and software components that may be used to implement aspects of the present disclosure. As illustrated, the security service 122 includes a processing unit 204, a network interface 206, a computer readable medium drive 208, an input/output device interface 209, all of which may communicate with one another by way of a communication bus. The components of the security service 122 may be physical hardware components or implemented in a virtualized environment.

The network interface 206 may provide connectivity to one or more networks or computing systems, such as the network 110 of FIG. 1. The processing unit 204 may thus receive information and instructions from other computing systems or services via a network. The processing unit 204 may also communicate to and from memory 210 and further provide output information for an optional display via the input/output device interface 209. In some embodiments, the security service 122 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the security service 122. The memory 210 may further include computer program instructions and other information for implementing aspects of the present disclosure. For example, in one embodiment, the memory 210 includes interface software 212 for receiving and processing content requests from requesting entities. Additionally, the memory 210 includes a browser controller 216 for controlling a network-based mirror one or more browsers 124A/124B/124C. Additionally, the security service 122 can further include a scanning service component 218 that analyzes the mirror browser according to a selected scanning technique, analyzes results from the mirror browser according to the selected scanning technique, and collects the analyzed results. Although the scanning service component 218 is illustrated as a module to the security service 122, the scanning service component may be implemented as a stand-alone application in the browser execution scanning service 120.

Figure 3:
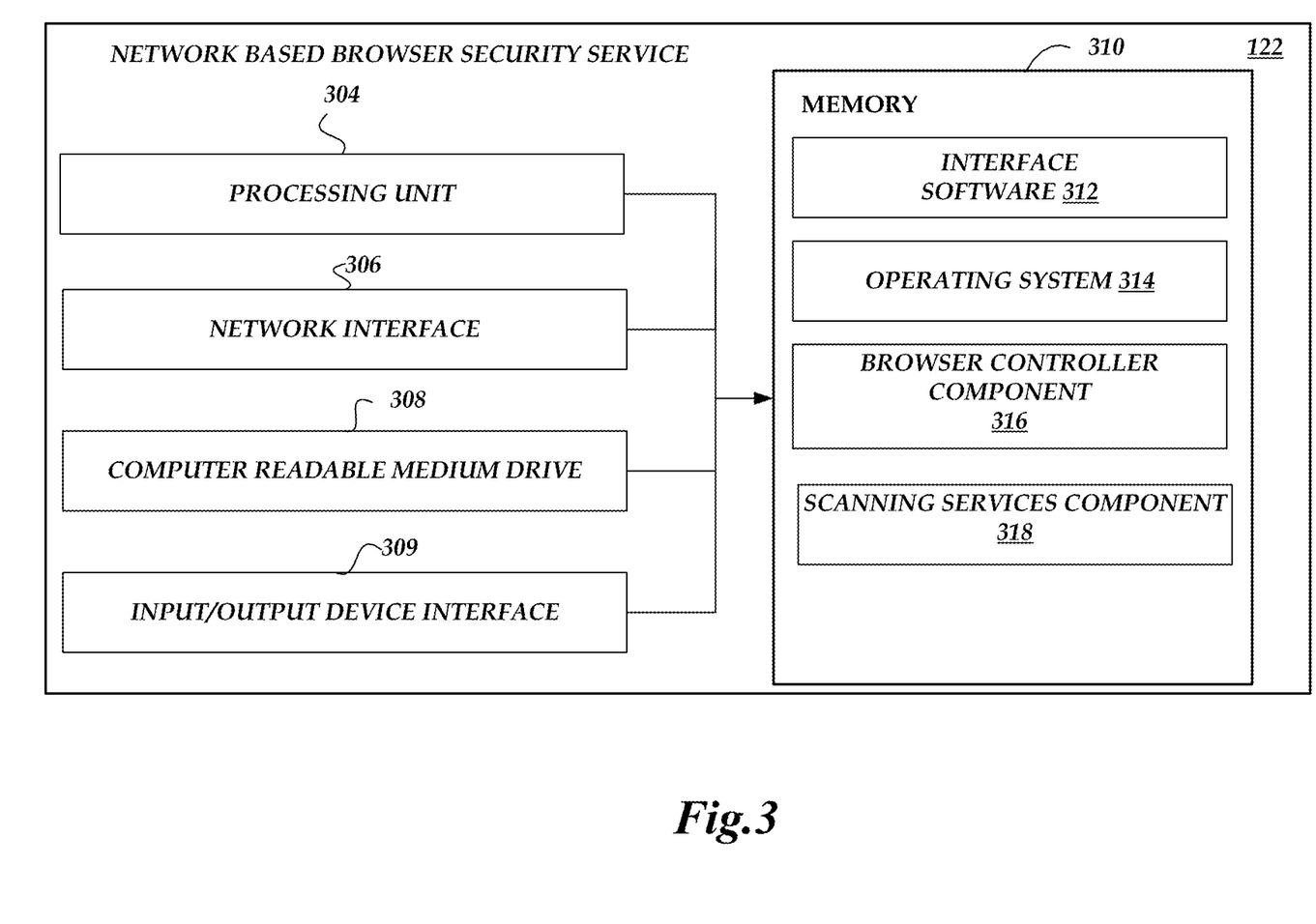
FIG. 3 is a block diagram of illustrative components of a network browser with security service configured to run a URL on one or more mirrored browsers in accordance with an illustrative embodiment.

FIG. 3 illustrates one embodiment of an architecture of a security service 132A implemented into a network browser 130A as described herein. As described above, the browser execution scanning service 120 includes a security service 132A implemented into a network browser 130A that scans for security issues by running a mirrored browser 134A. The general architecture of the security service 132A implemented into a network browser 130A depicted in FIG. 3 includes an arrangement of computer hardware and software components that may be used to implement aspects of the present disclosure. As illustrated, the security service 132A implemented into the network browser 130A includes a processing unit 304, a network interface 306, a computer readable medium drive 308, an input/output device interface 309, all of which may communicate with one another by way of a communication bus. The components of the security service 132A implemented into the network browser 130A may be physical hardware components or implemented in a virtualized environment.

The network interface 306 may provide connectivity to one or more networks or computing systems, such as the network 110 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the browser execution scanning service 120 including the security service 132A implemented into the network browser 130A may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the browser execution scanning service 120 includes a security service 132A. The memory 310 may further include computer program instructions and other information for implementing aspects of the present disclosure. For example, in one embodiment, the memory 310 includes interface software 312 for receiving and processing content requests from requesting entities. Additionally, the memory 310 includes a network-based mirrored browser controller 316 for controlling a network-based mirrored browser 134A. Additionally, the security service 122 can further include a scanning service component 318 that analyzes the mirror browser according to a selected scanning technique, analyzes results from the mirror browser according to the selected scanning technique, and collects the analyzed results. Although the scanning service component 318 is illustrated as a module to the security service 132A implemented into the network browser 130A, the scanning service component may be implemented as a stand-alone application in the browser execution scanning service 120.

Figure 4:
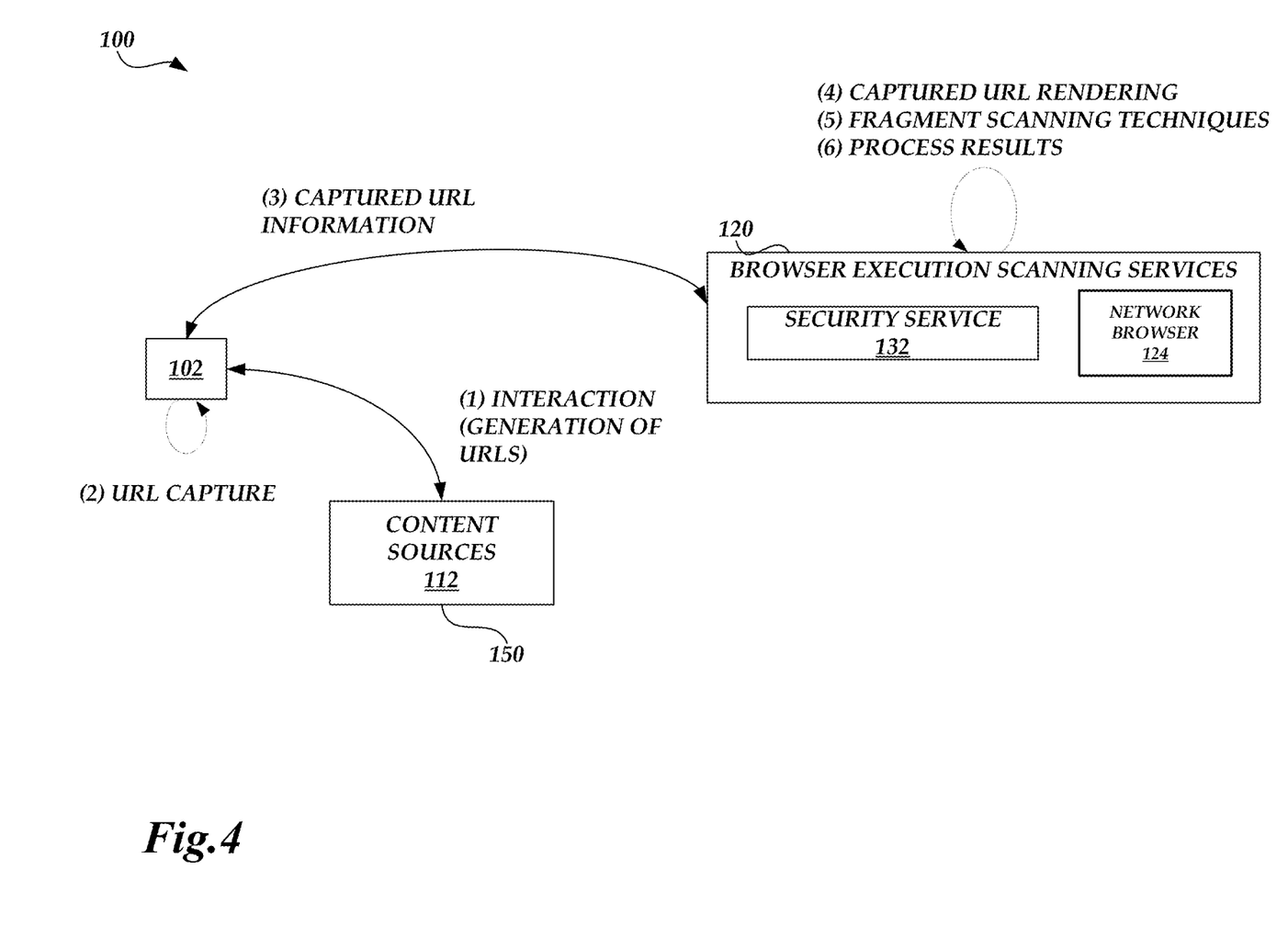
FIG. 4 is a block diagram of illustrative components of a security service illustrating the interaction between the security service and the mirrored browser in accordance with an illustrative embodiment.

FIG. 4 is an illustrative interaction for the security system 122 interacting with the client browser 104 which resides on the client device 102 in the case of the client browser as an independent browser as depicted in FIG. 1. In this embodiment, at (1), a client browser 104 interacts with the content service 112 when a URL is entered. The client browser interacts with the content service 112 through the network 110. At (2), the client browser 104, or other software application that can interact with the browser 104, captures the URL. As described above, the URL includes both a network portion and a fragment portion. The network portion is the portion of the URL that interacts with the network resource generally to the left of the hash sign. The fragment portion is the portion of the URL that changes on the client computing device but does not interact with the network resource. The fragment portion is generally the portion to the right of the hash sign. Subsequently, changes in the fragment are generally not seen on the network resource. See examples of the network portion and the fragment portion in examples 1 and 2 described above. Illustratively, the browser 104 captures the entire portion of the URL as a user or other software application interacts with the browser 104. For example, a user interacting with a browser 104 interface may cause a generation of multiple URL, such as through iteration of a multi-step enrollment/registration process. Each URL rendered as part of the multi-step process may be captured as a separate URL. In some embodiments, the captured URLs do not include state that indicates an order of generation or relationship between URLs.

At (3), the client browser 104 transmits the captured URL data to the security service 122 through the network 110. Illustratively, the captured URLs may be transmitted individually, sequentially, as a batch, via parallel transmission, and the like. The transmission can include additional information, such as the identity of the browser application 104, client device 102 or individual content sources 112/140 providing the content. At (4), the security service 122 processes the captured URLs by rendering the URLs on one or more browsers 124A/124B/124C. Both the security service 122 and one or more browsers 124A/124B/124C can reside on the browser execution scanning service. The security service 122 processes the URL by parsing the network portion from the fragment portion. The fragment includes one or more fragment parameters which can be used as testing parameters. The security service 122 selects one or more scanning techniques based on the fragment parameters. Fragment parameters can include but are not limited to color, location, view, state, search, tab, page, filter, tag, compliance, value, or text. The fragment can include one or more fragment parameters that can be tested independently or in combination with the other fragment parameters. The scanning technique can include but is not limited to any one of a number of scanning techniques. For example, at least one technique can include implementing a review of the identifiers related to a title in the URL to determine how information defined according to the identifier is rendered by the network-based browser, generally referred to as a title scanning technique. In another example, at least one technique can include implementing a review of the identifiers related to runtime scripts in the URL to determine how information defined according to the identifier is rendered by the network-based browser, generally referred to as a script scanning technique. In still another example, at least one technique can include implementing a review of the identifiers related to data in the URL to determine how information defined according to the identifier is rendered by the network-based browser, generally referred to as a data scanning technique. In yet a further example, at least one technique can include implementing a review of the identifiers related to an action executed during the rendering of the URL to determine how information defined according to the identifier is rendered by the network-based browser, generally referred to as an action scanning technique. In still another example, at least one technique can include implementing a review of the identifiers related to images associated with the URL to determine how information defined according to the identifier is rendered by the network-based browser, generally referred to as an image scanning technique. Additional or alternative techniques may also be implemented. Still further, one or more combinations of techniques may be illustratively implemented.

At (5), the security service 122 runs various scanning techniques by continuously performing the scanning techniques during the rendering of the URLs including various fragment portions on the browser 124. Cross-site scripting occurs when a webpage changes during runtime based on factors such as such as URI Fragments, the local storage of the client device, AJAX API calls, and client device frameworks that render custom templates. The security service 122 continuously runs the scanning techniques against the rendering of the URLs, including various fragment portions in the browser to test how the webpage changes during runtime in order to test for cross-site scripting. By testing various fragment parameters, the security service 122 can test for cross-site scripting issues that are not testing without running fragment parameters. For example, the security service 122 can utilize an embedded identifier, such as unique identifier, to track how the identifier is processed by the fragment portion during the rendering of the URL. At (6), the security service processes the results from the security scan by looking for various security issues. These issues can include cross site scripting issues or other issues related to security. Illustratively, the processing of the results can include the generation of various notifications, alerts, transmissions, or other forms of action. For example, the security service 132 can generate transmissions that can be provided to system administrators for identification of URLs that may include a defect or security risk. In another example, the security service 132 can provide notification to the browser application or a security service that can modify a black list (e.g., URLs that will be blocked) or white list (e.g., URLs that will be allowed) based on the processing result. The processing result can also include additional state or context information that facilitates providing additional context regarding the scanning techniques.

Figure 5:
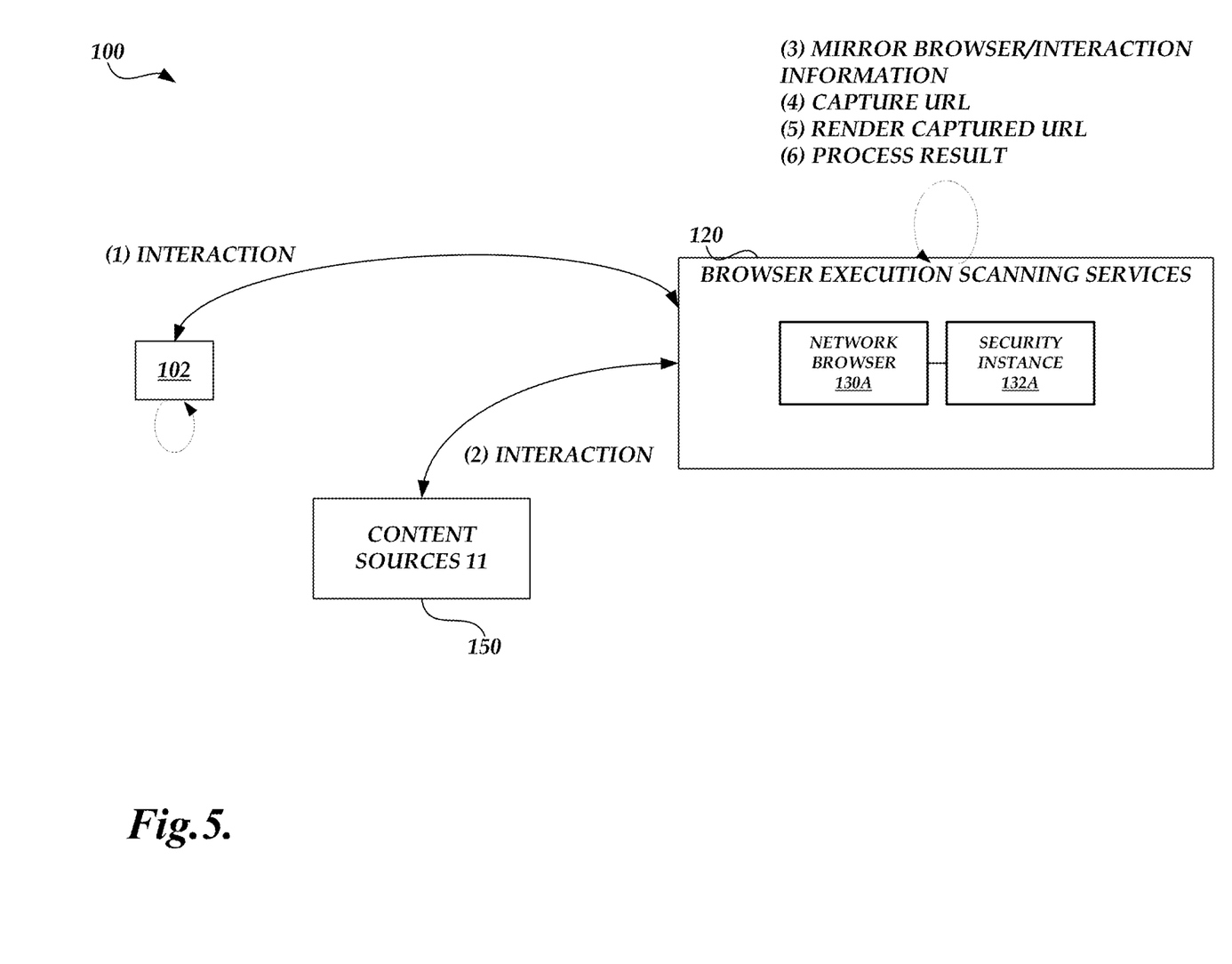
FIG. 5 is a block diagram of illustrative components of a network browser with security service illustrating the interaction between the network browser and the network security in accordance with an illustrative embodiment.

FIG. 5 is an illustrative interaction for the security service 132A which is integrated with the network-based mirrored browser 134A as show in FIG. 1. At (1), the client 106 interacts with a network browser 130A. In this embodiment, the client runs the client-side browser 108 which interacts with the network browser 130A in a split-browser configuration through the network 110. The network browser 130A pre-renders the webpage based on a user entered URL. The client-side browser 108 displays the pre-rendered webpage. At (2), the network browser 130A interacts with the content provider 140 through virtual machine in order to pre-render content for display on the client-side browser 108.

At (3), the network browser 130A mirrors the interaction information and send this information to the network security service 132A. In this embodiment, the network browser 130A includes client information including information such as cookies and passwords that reside only on the client device. Examples of cookies are session cookies, persistent cookies, secure cookies, HTTP-only cookies, same-site cookies, Third-party cookies, and supercookies. Such client information is not transmitted to the security service in the case of the independent browser.

At (4), the network security service 132A captures the URL and, at (5), the network security service 132A processes the captured URL. The network security service processes the captured URL by parsing the URL into a network portion and a fragment portion which are described above. The network security service 132A runs a mirror browser 134A which runs various scanning techniques to generate security results. Because the network security service 132A connects directly with the network browser 130A to create the mirror browser 134A, the mirror browser 134A includes client information which allows it to perform a more robust test than by merely capturing the URL and running test on the URL. Certain URLs are rendered differently depending on the client information. Fragment parameters can include color, location, view, state, search, tab, page, filter, tag, compliance, value, or text. The fragment can include one or more fragment parameters that can be tested independently or in combination with the other fragment parameters. As previously discussed, the scanning technique can include but is not limited to any one of a number of scanning techniques. For example, at least one technique can include implementing a review of the identifiers related to a title in the URL to determine how information defined according to the identifier is rendered by the network-based browser. In another example, at least one technique can include implementing a review of the identifiers related to runtime scripts in the URL to determine how information defined according to the identifier is rendered by the network-based browser. In still another example, at least one technique can include implementing a review of the identifiers related to data in the URL to determine how information defined according to the identifier is rendered by the network-based browser. In yet a further example, at least one technique can include implementing a review of the identifiers related to an action executed during the rendering of the URL to determine how information defined according to the identifier is rendered by the network-based browser. In still another example, at least one technique can include implementing a review of the identifiers related to images associated with the URL to determine how information defined according to the identifier is rendered by the network-based browser. Additional or alternative techniques may also be implemented. Still further, one or more combinations of techniques may be illustratively implemented.

The network security service 132A collects the generated security results and, at (6), the network security service 132A processes the security results. In some embodiments, the network security service is operable to alert a user of analyzed results that indicate security issues. In some embodiments, the scanning service component is operable to transmit the processed results. In some embodiments, the notification to the user can include at least one of email, instant message, push notification, phone call, and push notification.

Figure 6:
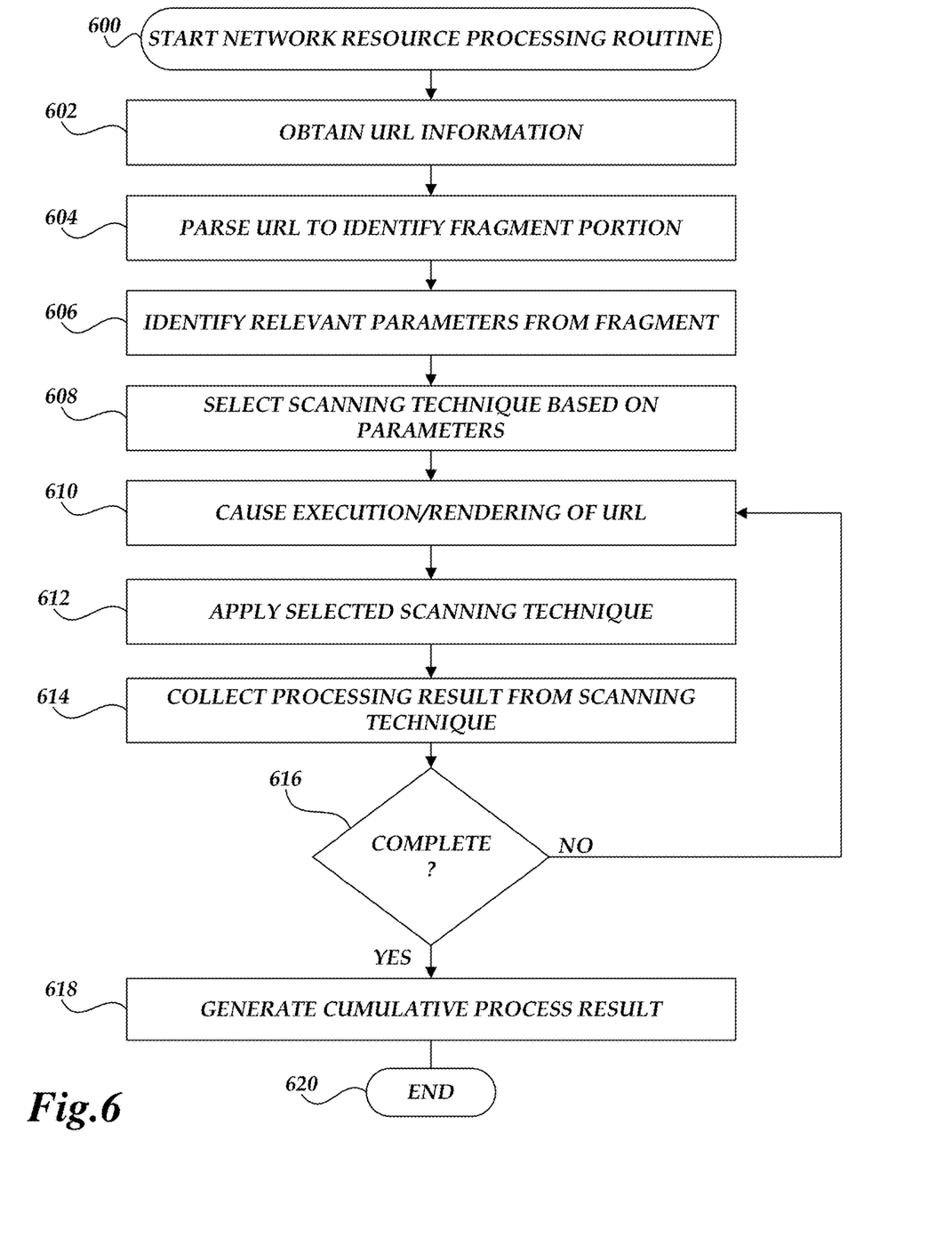
FIG. 6 is a flow diagram illustrative of a security routine implemented by a security service in accordance with an aspect of the present application.

FIG. 6 is a flow diagram of a network security routine 600. Illustratively, routine 600 can be performed on the security service 122 integrated with an independent browser or the security service 132A which is integrated with the network-based mirrored browser 134A. Advantages of the security service 132A integrated with the network-based mirror browser 134A are discussed above.

At block 602, the security service 122/132A obtains a URL. The URL includes both a network portion and a fragment portion. In the case of the network-based mirrored browser 134A, the security service 132A obtains the URL from the network-side browser 130A. In the case of the independent browser, the security service 122 obtains the URL from one or more client devices 102/106.

At block 604, the security service 122/132A parses the URL to separate the network portion and the fragment portion. The fragment portion includes one or more fragment parameters. Fragment parameters can include color, location, view, state, search, tab, page, filter, tag, compliance, value, or text. The fragment can include one or more fragment parameters that can be tested independently or in combination with the other fragment parameters. At block 606, the security service 122/132A identifies one or more testing parameters based on the fragment portion. The security service identifies the one or more testing parameters by analyzing the fragment portion for fragment parameters that are relevant to security issues. The At block 608, the security service 122/132A selects at least one scanning technique based on the identified one or more parameters at block 606. The scanning technique can include but is not limited to any one of a number of scanning techniques. For example, at least one technique can include implementing a review of the identifiers related to a title in the URL to determine how information defined according to the identifier is rendered by the network-based browser. In another example, at least one technique can include implementing a review of the identifiers related to runtime scripts in the URL to determine how information defined according to the identifier is rendered by the network-based browser. In still another example, at least one technique can include implementing a review of the identifiers related to data in the URL to determine how information defined according to the identifier is rendered by the network-based browser. In yet a further example, at least one technique can include implementing a review of the identifiers related to an action executed during the rendering of the URL to determine how information defined according to the identifier is rendered by the network-based browser. In still another example, at least one technique can include implementing a review of the identifiers related to images associated with the URL to determine how information defined according to the identifier is rendered by the network-based browser. Additional or alternative techniques may also be implemented. Still further, one or more combinations of techniques may be illustratively implemented. Other scanning techniques that are used to vary fragment parameters can be used.

At block 610, the security service 122/132A causes the execution of the network-based mirrored browser 134A/124 based on the selected scanning technique selected in block 608. The security service monitors the network-based mirrored browser 134A/124 during the scan to determine whether there are security issues. The network-based mirrored browser is either a network-based mirrored browser 124 that is connected to a security service 122 based on an independent browser or the network-based mirrored browser 134A is connected to a network security service 132A which is associated with a network-based browser in a split-browser configuration. In a split-browser configuration, the network-based mirrored browser mirrors the network-based browser which includes client information. Client information allows the network security service 132A associated with a network-based browser in a split-browser configuration to do more robust testing because many URLs run different webpages based on different client information.

At block 612, the security service 122/132A analyzes results from the network-based mirrored browser 134A/124 according to at least one scanning technique selected at block 608. The security service 122/132A can repeat blocks 610, 612, and 614 in order to fully run the scanning technique. At block 614, the security service 122/132A generates processed results corresponding to the characterization of the URL based on the selected at least one scanning technique. In some embodiments, the scan can be repeated with another selected scanning technique. Illustratively, the processing of the results can include the generation of various notifications, alerts, transmissions, or other forms of action. For example, the security service 132 can generate transmissions that can be provided to system administrators for identification of URLs that may include a defect or security risk. In another example, the security service 132 can provide notification to the browser application or a security service that can modify a black list (e.g., URLs that will be blocked) or white list (e.g., URLs that will be allowed) based on the processing result. The processing result can also include additional state or context information that facilitates providing additional context regarding the scanning techniques.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for applying scanning techniques related to execution of browser applications, the system comprising:
one or more computing device associated with a processor and a memory for executing computer-executable instructions for implementing a browser execution scanning service, the browser execution scanning service including:
a set of network-side browsers, wherein individual network-side browsers are configured to work in conjunction with an identified client browser such that individual network-side browser includes client information and receives a uniform resource locator ("URL") from a client-side browser process the URL to generate a processing results corresponding to the URL, and sends the pre-rendered content to the client browser, a set of network-based mirror browsers, wherein individual network-based mirror browsers correspond to a network-side browser to replicate at least a portion of the processing of the URL to generate the processing result utilizing the client information, and a scanning service component operable to:
  obtain the URL executed by the individual network-based mirror browser, wherein the URL includes a first portion corresponding to information transmitted between a browser and network resources as part of a rendering process and a second portion corresponding to information processed at the network-based mirror browser during the rendering process but not transmitted with the first portion of the URL;
  parse the URL to identify the second portion;
  identify one or more testing parameters from the second portion;
  select at least one scanning technique based on the identified one or more testing parameters;
  cause rendering of the URL on least one mirror browser in accordance with the content identified by the first portion as processed by the at least one network-based mirror browser utilizing the client information and the identified one or more testing parameters from the second portion;
  apply the selected at least one scanning technique to analyze the rendering of the URL on the at least one network-based mirror browser;
  collect the analyzed results; and
  generate processed results corresponding to a characterization of the URL based on the selected at least one scanning technique.

2. The system of claim 1 further comprising one or more client devices, wherein the individual client devices of the one or more client devices includes a processor and memory that execute computer executable instructions that cause the individual client devices to operate the client-side browser, wherein the client-side browser is capable of sending a URL, receiving pre-rendered content, and displaying pre-rendered content.

3. The system of claim 1, wherein the at least one scanning technique includes at least one title scanning technique, script scanning technique, data scanning technique, action scanning technique or image scanning technique.

4. The system of claim 1, wherein the one or more testing parameters comprise at least one of color, location, view, state, search, tab, page, filter, tag, compliance, value, or text.

5. The system of claim 1, wherein the scanning service component is further operable to generate at least one notification based on the generated processed results.

6. A method for implementing scanning techniques regarding execution of browser application, the method comprising:
  obtaining a uniform resource locator ("URL") to be executed by a client browser application, wherein the URL includes a first portion corresponding to information transmitted between a browser and a network resources and a second portion corresponding to information processed at the browser during the rendering process but not passed to the network resources;
  causing rendering of the URL on a target network browser application in accordance with the content identified by the first portion as processed by the target network browser utilizing the information contained in the second portion;
  characterizing processing results from the target network browser application according to a selected at least one scanning technique; and
  generating information related to the characterized processing results.

7. The method of claim 6, wherein the at least one scanning technique includes at least one title scanning technique, script scanning technique, data scanning technique, or image scanning technique.

8. The method of claim 6 further comprising:
  selecting a different scanning technique from the at least one scanning technique;
  characterizing processing results from the target browser application according to the different scanning technique; and
  generating information related to the characterized processing results.

9. The method of claim 6 further comprising identifying one or more testing parameters from the second portion.

10. The method of claim 9, wherein the selected at least one scanning technique is based on the identified one or more parameters.

11. The method of claim 6 further comprising generating a notification included in the generated information.

12. The method of claim 6, wherein the target network browser application is a network-based mirror browser associated with a network-side browser that includes client information and wherein the network-side browser and the client browser application form a split-browser configuration.

13. The method of claim 6, wherein the client browser application is an independent browser that directly obtains content from a content source through the network resource and the target browser application is a mirror browser which is controlled by a scanning service.

14. A method for implementing scanning techniques regarding execution of browser application, the method comprising:
  obtaining a uniform resource locator ("URL") to be executed by a client browser application, wherein the URL includes a first portion corresponding to information transmitted between the client browser application and network resources and a second portion corresponding to information processed at the client browser application during the rendering process but not passed to the network resources;
  rendering the URL on a network-based browser application according to a selected at least one scanning technique based on at least modification to the second portion of the URL;
  monitoring rendering of the URL on a network-based browser application;
  characterizing the rendering of the URL on a network-based browser application; and
  generating information related to the characterized execution.

15. The method of claim 14, wherein the at least one scanning technique includes at least one title scanning technique, script scanning technique, data scanning technique, or image scanning technique.

16. The method of claim 14 further comprising identifying one or more testing parameters from the second portion.

17. The method of claim 14 further comprising generating a notification included in the generated information.

18. The method of claim 14, wherein the network-based browser application is a network-based mirror browser associated with a network-side browser that includes client information and wherein the network-side browser and the client browser application form a split-browser configuration.

19. The method of claim 14, wherein the network-based browser application is an independent browser that directly obtains content from a content source through the network resource and the target browser application is a network browser which is controlled by a scanning service.

20. The method of claim 19, wherein the URL to be executed by a client browser application corresponds to a captured URL.

21. The method of claim 14, wherein generating information related to the characterized execution includes generating a notification corresponding to the characterized rendering.

22. The method of claim 14, wherein generating information related to the characterized execution includes initiating at least one corrective action based on the characterized rendering.

23. The system of claim 1, wherein the second portion includes at least one of color, location, view, state, search, tab, page, filter, tag, compliance, value, or text.

24. The system of claim 1, wherein the client information corresponds to cookies or stored passwords.

25. The system of claim 24, wherein cookies includes to session cookies, persistent cookies, secure cookies, HTTP-only cookies, same-site cookies, third-party cookies, or supercookies.

26. The method of claim 6, wherein the second portion includes at least one of color, location, view, state, search, tab, page, filter, tag, compliance, value, or text.

27. The method of claim 12, wherein client information corresponds to cookies or stored passwords.

28. The method of claim 27, wherein cookies includes session cookies, persistent cookies, secure cookies, HTTP-only cookies, same-site cookies, third-party cookies, or supercookies.

29. The method of claim 14, wherein the second portion includes at least one of color, location, view, state, search, tab, filter, tag, compliance, value, or text.

30. The method of claim 18, wherein client information corresponds to cookies or stored passwords.

31. The method of claim 30, wherein cookies includes session cookies, persistent cookies, secure cookies, HTTP-only cookies, same-site cookies, third-party cookies, or supercookies.

* * * * *